April 9, 1929.  E. F. NORELIUS  1,708,104
TRACKLAYING ADAPTER
Filed Oct. 26, 1925   2 Sheets-Sheet 1

Inventor
Emil F. Norelius
By W. N. Roach
Attorney

April 9, 1929.  E. F. NORELIUS  1,708,104
TRACKLAYING ADAPTER
Filed Oct. 26, 1925   2 Sheets-Sheet 2

Inventor
Emil F. Norelius
By W. N. Roach.
Attorney

Patented Apr. 9, 1929.

1,708,104

UNITED STATES PATENT OFFICE.

EMIL F. NORELIUS, OF DAVENPORT, IOWA.

TRACKLAYING ADAPTER.

Application filed October 26, 1925. Serial No. 65,031.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to me of any royalty thereon.

The present invention relates to a tracklaying adapter particularly designed for converting wheeled tractors to track laying tractors but also capable of original application.

In the application of adapters to existing types of tractors such as the Fordson, it is desirable to effect the conversion from wheel to belt traction by a minimum substitution of parts and without requiring modification of the retained units or interfering with the standard characteristics of the vehicle.

The present invention relates specifically to a half-track adapter in which the track laying units do not include the front steering wheels and hence a consideration of the differential and power connections need not be involved.

According to the invention, I provide specially designed axle housings which may be readily substituted for the conventional housings and are attachable in the same manner to the differential housing. The adapter housings are provided with cap plates forming a casing for the final drive mechanism and constituting an inner frame member to which an outer frame member is secured. The frame thus provided mounts one of the track carrying wheels and also a central supporting roller flexibly carrying the weight of the vehicle.

To these and other ends, my invention consists in the construction, arrangement, and combination of elements described hereinafter and pointed out in the claims forming a part of this specification.

A practical embodiment of the invention is illustrated in the accompanying drawings, wherein.

Figure 1:
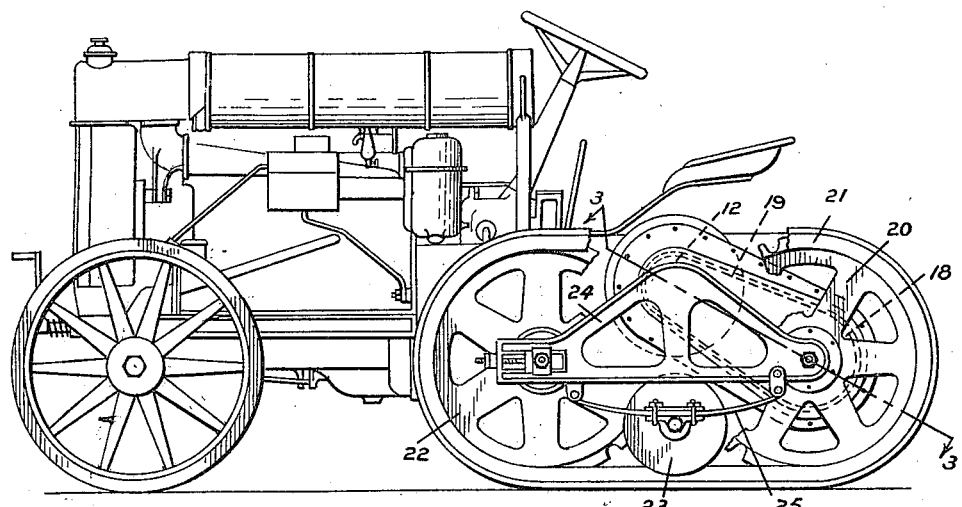
Fig. 1 is a view in side elevation, parts broken away, showing the application of the adapter forming the subject of the invention.
Figure 2:
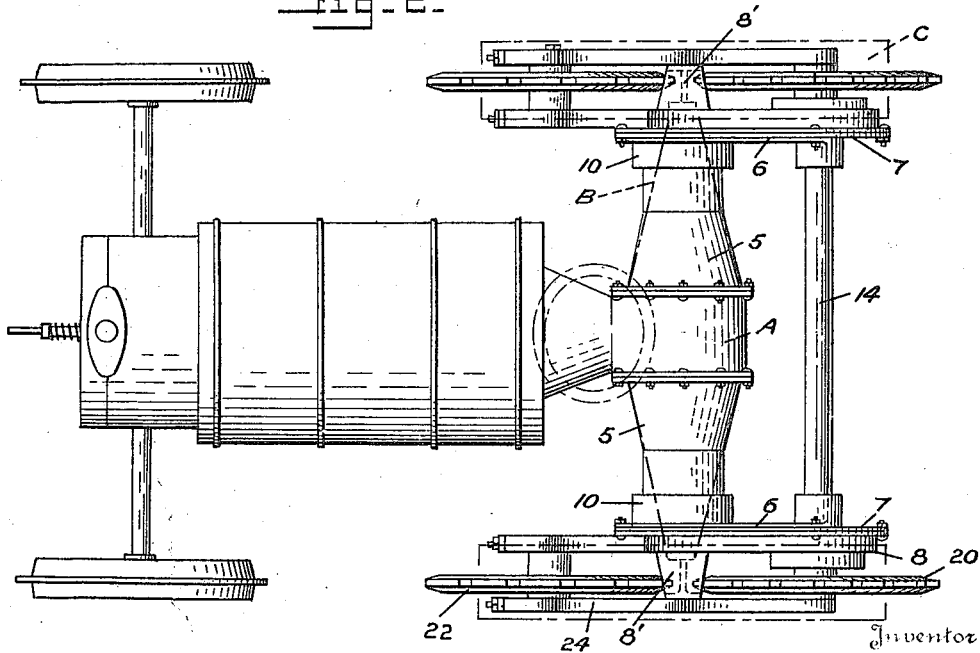
Fig. 2 is a plan view thereof, showing in dotted lines the axle housings of a conventional wheeled tractor.

Referring to the drawings by characters of reference:

The improved adapter is shown in the drawings as applied to a Fordson wheeled tractor although it is not restricted to any particular type of existing tractor and may be incorporated originally in a vehicle of this character.

The rear assembly of the Fordson tractor comprises essentially the differential housing A, to which are attached the axle housings B which inclose the countershafts carrying the usual driving wheels (not shown).

Figure 3:
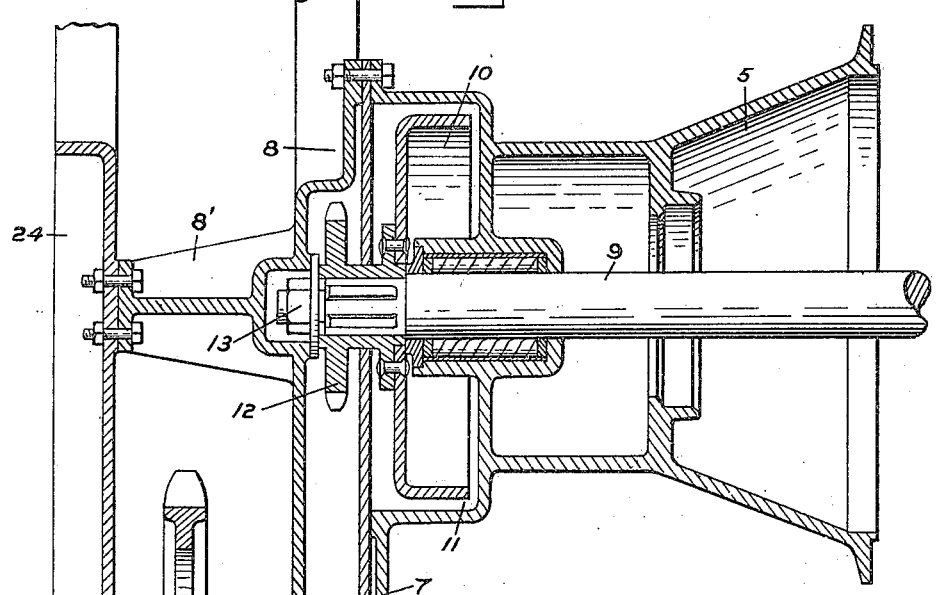
Fig. 3 is a sectional view on the line 3—3 of Fig. 2.
Figure 4:
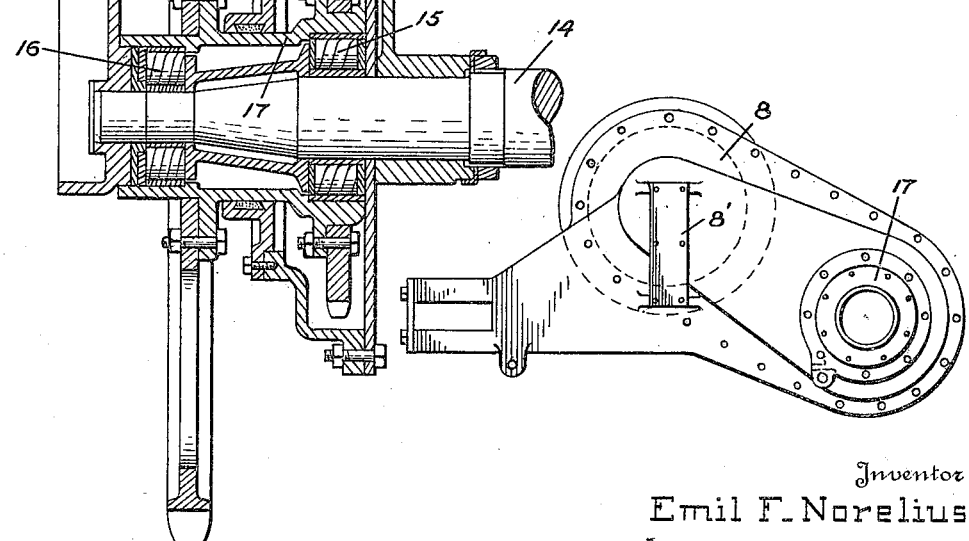
Fig. 4 is a view in side elevation of the inner member of the frame.

In the present application of the adapter axle housings 5 which may be readily substituted for the housings B and are attachable to the differential housing A in the same manner terminate in rearwardly inclined portions 6. The whole outer end of the housing is preferably closed by an end plate 7 which serves with a cap plate 8 to define a casing for the final drive unit. Within the housing 5 are the countershafts 9 which replace the conventional countershafts. A brake drum 10 disposed in a dry pocket 11 and a sprocket wheel 12 disposed in the casing for the final drive unit are keyed on to the countershaft and retained by the nut 13. The brake is to be used as a service brake and also to assist the front wheels in steering. Below and to the rear of the countershafts is a through shaft 14 spanning the opposite inclined portion 6 of the axle housings. On each end of the through shaft is mounted by means of roller bearings 15 and 16 a sleeve hub 17 to which are attached respectively within and exterior of the cap plate a sprocket wheel 18 for receiving the driving chain 19 and a larger sprocket wheel 20 for driving the track 21. In addition to the drive sprocket 20 and track 21 the track laying unit consists of a front idler 22 and a supporting roller 23 both of which are carried by a frame, the inner member of which is constituted by the cap plate 8 (Figs. 3 and 4) of the frame journaled at its rearmost extremity on the through shaft 14. The inner and outer members of the frame are rigidly connected intermediate their ends by a transverse brace 8′ which is preferably formed integral with the inner member. The frame thus becomes a part of the axle housing 5 and has no relative motion with respect to the chassis of the vehicle.

The supporting roller 23 which is intermediate the track carrying wheels is directly mounted on the frame by means of semi-elliptic springs 25, one of which is secured to each of the frame members 8 and 24. The springs are of sufficient capacity to practically carry the weight of the rear of the vehicle when standing on level ground and in this manner provide flexibility to the entire unit.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A track laying adapter for wheeled vehicles embodying an axle housing, a casing attached to the axle housing and constituting the inner member of a frame, elements of a drive mechanism in the casing, an outer frame member secured to the inner member, a track laying unit carried by the frame between its inner and outer members, and a supporting roller flexibly mounted on the frame between the wheels of the track laying unit.

2. A track laying adapter for wheeled vehicles embodying an axle housing, a member forming a closure for the axle housing and constituting the inner member of a frame, an outer frame member secured to the inner member, a track laying unit carried by the frame between its inner and outer members and a supporting roller flexibly mounted on the frame between the wheels of the track laying unit.

3. A track laying adapter for wheeled vehicles embodying an axle housing, a casing attached to the axle housing and constituting the inner member of a frame, elements of a drive mechanism in the casing, an outer frame member secured to the case, substantially co-axial with the axle housing, and a track laying unit carried by the frame and including a track drive sprocket secured to the drive mechanism in the casing and positioned between the casing and the outer frame member.

4. A track laying adapter for wheeled vehicles embodying an axle housing, a casing attached to the axle housing and constituting the inner member of a frame, elements of a drive mechanism in the casing, an outer frame member secured to the case and a track laying unit carried by the frame and including a track drive sprocket secured to the drive mechanism in the casing and positioned between the casing and the outer frame member.

EMIL F. NORELIUS.